United States Patent
Weissgerber et al.

(10) Patent No.: US 6,989,191 B2
(45) Date of Patent: Jan. 24, 2006

(54) COMPOSITE PAPER MATERIAL WITH A PRESSURE-SENSITIVE ADHESIVE COATING FINISHED TO BE RESISTANT TO REPULPING

(75) Inventors: Rudolf Weissgerber, Burghausen (DE); Thomas Bastelberger, Emmerting (DE)

(73) Assignee: Wacker-Chemie GmbH, Munich (DE)

( * ) Notice: Subject to any disclaimer, the term of this patent is extended or adjusted under 35 U.S.C. 154(b) by 204 days.

(21) Appl. No.: 10/462,505

(22) Filed: Jun. 16, 2003

(65) Prior Publication Data

US 2004/0048061 A1    Mar. 11, 2004

Related U.S. Application Data

(63) Continuation of application No. 09/925,916, filed on Aug. 9, 2001, now abandoned, which is a continuation of application No. 09/308,732, filed on May 24, 1999, now abandoned.
<

(30) Foreign Application Priority Data

Dec. 23, 1996 (DE) ................................ 196 54 177

(51) Int. Cl.
C09J 7/04       (2006.01)
D21H 17/34      (2006.01)

(52) U.S. Cl. ...................... 428/354; 428/343; 428/353; 428/40.1; 428/355 AC; 428/537.5; 428/511; 427/208.4; 427/208.2

(58) Field of Classification Search ................ 428/354, 428/343, 353, 40.1, 355 AC, 537.5, 511; 427/208.4, 208.2
See application file for complete search history.

(56) References Cited

U.S. PATENT DOCUMENTS

| 5,514,435 A | 5/1996 | Suzuki |
| 5,536,787 A | 7/1996 | Scholz |
| 5,759,347 A | 6/1998 | Leube |

FOREIGN PATENT DOCUMENTS

| DE | 1 228 358 | 11/1966 |
| EP | 0 438 781 A2 | 7/1991 |
| EP | 0 622 432 A1 | 11/1994 |
| WO | WO 93/08239 | 4/1993 |
| WO | WO 94/17998 | 8/1994 |
| WO | WO 96/08539 | 3/1996 |

OTHER PUBLICATIONS

Derwent Abstract corresponding to JP 01034056 AN 95-110865.
The Polymer Handbook, 2$^{nd}$ Edition, J. Wiley & Sons, New York (1975).
Fox, T.G., Bull, Am, Physics Soc. 1, 3, p. 123 9(1956).

Primary Examiner—Daniel Zirker
(74) Attorney, Agent, or Firm—Brooks Kushman P.C.

(57) ABSTRACT

The invention relates to a paper composite material with repulp-resistant adhesive coating, consisting of a paper carrier and an adhesive layer, characterized in that an intermediate coat of a dispersion polymer film containing a protective colloid and/or an emulsifying agent and with a glass transition temperature Tg of −20° to 40° is applied between the paper carrier and the adhesive coating. The invention also relates to a method for the production of paper composite material with repulp-resistant adhesive coating.

23 Claims, No Drawings

COMPOSITE PAPER MATERIAL WITH A PRESSURE-SENSITIVE ADHESIVE COATING FINISHED TO BE RESISTANT TO REPULPING

CROSS-REFERENCE TO RELATED APPLICATION

This is a continuation of application(s) Ser. No. 09/925,916 filed on Aug. 9, 2001, now abandoned, which is a continuation of application Ser. No. 09/308,732 filed on May 24, 1999, now abandoned, which claims priority to German Appln. DE 196 54 177.8 filed Dec. 23, 1996.

The invention relates to a composite paper material, especially labels, with a pressure-sensitive adhesive coating finished to be resistant to repulping, and to a process for the production thereof.

A high percentage of waste paper is collected and recycled. This waste paper contains a number of non-cellulosic "impurities", such as, for example, adhesive tapes, film materials, composite materials and adhesive films. For recycling, the collected waste paper is disintegrated in a pulper (defibrator) in water, at a neutral to alkaline pH, by mechanical action as far as possible down to the individual cellulose fibres. This is followed by cleaning in a multi-stage process with the object of obtaining a pulp of cellulose fibres which is as pure as possible and which can be used on the paper machine without causing faults. The cleaning steps virtually always comprise a screening, usually by means of screens with slotted holes, for example of about 0.15 mm hole width. Occasionally, an additional flotation is carried out subsequently, especially if printing inks are to be removed (de-inking) in order to reach better paper qualities.

In the processing of fibre pulps, obtained from waste paper, on high-speed paper machines, faults occur again and again due to the formation of so-called "stickies", for example owing to residues of pressure-sensitive adhesive layers from labels which have not been separated off during the processing step. "Stickies" are to be understood here as lumps or clusters of preferentially polymers which are themselves tacky and which become noticeable in the newly produced paper by "fatty" spots and by individual sheets sticking together. Moreover, stickies deposit, for example, on rolls and screens of the paper machines and thereby cause faults in the operating sequence, for example wet tearing. Both problems cause high costs. The increasing introduction of closed water circulation systems in waste paper processing and the increasing quantity of adhesive fractions in waste paper, especially of pressure-sensitive adhesives due to the wider use of pressure-sensitive adhesive paper labels, have in recent years caused the sticky problem to become substantially more serious.

Methods of separating off adhesive residues from the fibre pulp in the recycling of waste paper in order to solve this problem are therefore being sought. This turns out to be difficult especially in the case of films of pressure-sensitive adhesives, since these disintegrate into small pieces during defibration. Due to the size of the pieces and the softness or flexibility of these self-adhesive masses, these can be removed by screening only to a very restricted extent.

In WO-A 93/08239, it is proposed to use recyclable labels with a repulpable layer of pressure-sensitive adhesive, the layer of pressure-sensitive adhesive consisting of an acrylate polymer with a content of 10 to 20% of comonomer units containing carboxyl groups. WO-A 94/17998 follows a similar approach, with the difference that 10 to 20% of hydroxyethyl methacrylate units are copolymerized. In WO-A 96/08539, repulpable labels are described which are finished with two layers of different pressure-sensitive adhesives. The repulping resistance of the pressure-sensitive adhesive component is obtained by applying to the paper carrier a water-dispersible layer of pressure-sensitive adhesive, which is then laminated to a layer of pressure-sensitive adhesive which is not redispersible in water.

It is a disadvantage that redispersed particles of the dispersible layer of pressure-sensitive adhesive concentrate during repulping, involving the risk of the formation of stickies, and must be removed at a high cost, for example by an additional flotation step. If no additional flotation step is carried out, the effluent must be cleaned in treatment plants or it would pollute the receiving water.

In EP-A 438,781, labels are claimed which are composed of a paper layer, a polymer film resistant to repulping and a pressure-sensitive adhesive resistant to repulping. In this case, the plastic film is extruded onto the paper or applied in the liquid state as a melt. If desired, the layer of pressure-sensitive adhesive is anchored on the film by means of an additional primer layer. The disadvantage is that, when the polymer film is applied in the liquid state, the paper fibres are enveloped and bonded by liquid polymer. The fibres are therefore no longer set free on repulping and are lost for recycling. A further disadvantage is that a pulping-resistant pressure-sensitive adhesive is applied, even though pressure-sensitive adhesives are in general not pulping-resistant.

It was therefore the object to provide labels based on a paper carrier and conventional pressure-sensitive adhesives which are finished in such a way that the layer of pressure-sensitive adhesive does not completely disintegrate on pulping, but is obtained in the form of screenable particles, and that the paper fibre is completely set free on repulping.

The object has been achieved by a moisture-resistant, non-repulpable but hydrophilic interlayer which is applied in the form of an aqueous dispersion.

The invention relates to a composite paper material with a pressure-sensitive adhesive coating finished to be resistant to repulping, comprising a paper carrier and a layer of pressure-sensitive adhesive, characterized in that an interlayer comprising a dispersion polymer film containing a protective colloid and/or an emulsifier and having a glass transition temperature Tg from −20° C. to +40° C. has been applied between the paper carrier and the layer of pressure-sensitive adhesive.

The invention furthermore relates to a process for producing a composite paper material with a pressure-sensitive adhesive coating finished to be resistant to repulping, characterized in that
 a) in a first process step for producing the interlayer, an aqueous dispersion of a homo- or copolymer, stabilized by a protective colloid and/or an emulsifier and having a glass transition temperature Tg from −20° C. to +40° C., from the group consisting of homo- or copolymers of vinyl esters of alkylcarboxylic acids having 1 to 15 C atoms, homo- or copolymers of esters of (meth)acrylic acid with alcohols having 1 to 12 C atoms, and styrene/butadiene copolymers, is applied and dried, and
 b) in a second process step, a pressure-sensitive adhesive composition is applied to the polymer layer from the first process step and, if appropriate, is dried.

The paper carriers employed can be the unsized or sized paper grades that are particularly common in the production of labels.

Suitable polymers for the moisture-resistant interlayer with the hydrophilic surface are homo- or copolymers, stabilized by a protective colloid and/or emulsifier, from the group consisting of homo- or copolymers of vinyl esters of alkylcarboxylic acids having 1 to 15 C atoms, homo- or copolymers of esters of acrylic acid or methacrylic acid with alcohols having 1 to 12 C atoms, if appropriate in combination with styrene, and styrene/butadiene copolymers.

Moisture-resistant here is taken to mean that the interlayer survives the repulping step without disintegrating completely into non-screenable particles. The hydrophilic surface is provided by the content of protective colloid or emulsifier, if necessary by auxiliary monomers, and it facilitates the detachment of the interlayer from the paper fibre.

Preferred vinyl esters are vinyl acetate, vinyl propionate, vinyl 2-ethylhexanoate, vinyl laurate, 1-methylvinyl acetate, vinyl pivalate and vinyl esters of alpha-branched monocarboxylic acids having 5 to 10 C atoms, for example VV5$^R$, VeoVa9$^R$ or VeoVa10$^R$. Vinyl acetate is particular preferred.

Preferred methacrylic esters or acrylic acid esters are methylacrylate, methylmethacrylate, ethyl acrylate, ethyl methacrylate, propyl acrylate, propyl methacrylate, n-butyl acrylate, n-butyl methacrylate, iso-butyl acrylate, iso-butyl methacrylate, t-butyl acrylate, t-butyl methacrylate, 2-ethylhexyl acrylate and 2-ethylhexyl methacrylate. Methyl acrylate, methyl methacrylate, n-butyl acrylate and 2-ethylhexyl acrylate are particularly preferred.

In a preferred embodiment, water-soluble, ethylenically unsaturated monomers can, if appropriate, also have been copolymerized in a proportion of up to 5% by weight, relative to the total weight of polymer. Examples of these are acrylic acid, methacrylic acid, acrylamide, methacrylamide, hydroxyethyl acrylate, hydroxyethyl methacrylate, hydroxypropyl acrylate, hydroxypropyl methacrylate and acrylamidopropanesulphonic acid.

Examples of suitable vinyl ester polymers which, if appropriate, also contain water-soluble or cross-linkable, ethylenically unsaturated monomers, are: vinyl acetate homopolymer, vinyl acetate/ethylene copolymers, vinyl acetate/ethylene/vinyl chloride copolymers, vinyl acetate copolymers with the vinyl ester of an alpha-branched carboxylic acid having 5 to 10 C atoms and vinyl acetate/n-butyl acrylate copolymers.

Examples of suitable (meth)acrylic acid polymers are:

copolymers of methyl methacrylate with n-butyl acrylate and/or 2-ethylhexyl acrylate and also copolymers of n-butyl acrylate or 2-ethylhexyl acrylate with styrene.

The selection of monomer or the selection of the proportions by weight of the comonomers is made here in such a way that the homo- and co-polymers have a glass transition temperature Tg from −20° C. to +40° C., preferably −15° C. to +25° C., especially −5° C. to +10° C. If a particularly stiff composite paper material is desired, the use of polymers having a high Tg is preferred. The glass transition temperature Tg of the polymers can be determined in the known manner by means of differential scanning calorimetry (DSC). The Tg can also be approximately precalculated by means of the Fox equation. According to Fox T. G., Bull. Am. Physics Soc. 1, 3, page 123 (1956), the following applies: $1/Tg = x_1/Tg_1 + x_2/Tg_2 + \ldots + x_n/Tg_n$, $x_n$ being the mass fraction (% by weight/100) of the monomer n, and $Tg_n$ being the glass transition temperature in degrees Kelvin of the homopolymer from the monomer n. Tg values for homopolymers are listed in Polymer Handbook, 2nd Edition, J. Wiley & Sons, New York (1975).

To improve the repulping resistance, the dispersion polymers of the interlayer can, if desired, also contain one or more auxiliary monomer units for crosslinking, preferably 0.1 to 5% by weight thereof, in each case relative to the total weight of the polymer. Examples of these are N-methylolacrylamide, N-methylolmethacrylamide, N-(alkoxymethyl) acrylamides or N-(alkoxy-methyl)methacrylamides having a $C_1$- to $C_6$-alkyl radical, such as N-(isobutoxymethyl)acrylamide (IBMA), N-(isobutoxymethyl)methacrylamide (IBMMA), N-(n-butoxymethyl)acrylamide (NBMA) and N-(n-butoxymethyl)methacrylamide (NBMMA). In the case of these comonomers, the cross-linking can, if appropriate, also be promoted by the addition of acidic hardeners, for example metal salts of Al(III) such as Al nitrate, Al chloride, Cr(III) salts such as chromiumnitrate and Zr(IV) salts such as zirconiumoxychloride. The quantity of metal salt amounts in general to 0.5 to 5.0% by weight, relative to the total weight of the polymer.

Further examples of comonomers having a cross-linking action are ethylenically polyunsaturated comonomers such as ethylene glycol diacrylate, 1,3-butylene glycol diacrylate, 1,4-butylene glycol diacrylate, propylene glycol diacrylate, divinyl adipate, divinylbenzene, vinyl methacrylate, vinyl acrylate, allyl methacrylate, allyl acrylate, diallyl maleate, diallyl phthalate, diallyl fumarate, methylenebisacrylamide, cyclopentadienyl acrylate or triallyl cyanurate. The repulping resistance can also be improved by external crosslinking by means of the addition of di- or polyfunctional crosslinking agents, for example di- or polyfunctional isocyanates such as hexamethylene diisocyanate or 2,4- and 2,6-toluylene diisocyanate. Comonomers containing carbonyl groups, such as diacetoneacrylamide or crotonaldehyde, which are converted for crosslinking or anchoring with the addition of crosslinking agents containing hydrazide groups, such as adipic acid dihydrazide, or of crosslinking agents containing aminooxy groups, such as 1,4-diaminooxybutane or 2-aminooxypropionic acid hydrazide, are also suitable. The content of the said comonomers containing carbonyl groups or of the crosslinking agents amounts in general to 0.1 to 3.0% by weight, relative to the polymer.

The hydrophilic character of the interlayer is effected above all by the content of emulsifier and/or protective colloid. The emulsifiers used can be any commercially available ionic and nonionic emulsifiers. In particular, these can be: block copolymers of ethylene oxide and propylene oxide, ethoxylated alkylphenols, ethoxylated fatty alcohols and also alkali metal salts and ammonium salts of long-chain alkyl sulphates ($C_8$- to $C_{12}$-alkyl radical), of sulphuric acid half-esters of ethoxylated alkanols and ethoxylated alkylphenols, of alkylsulphonic acids and of alkylarylsulphonic acids.

Examples of suitable protective colloids are celluloses such as hydroxyethylcellulose, hydroxypropylcellulose and carboxymethylcellulose, starches and dextrins, cyclodextrins, fully or partially saponified polyvinyl alcohols, polyethylene glycol, polyvinylpyrrolidone, and homo- and copolymers of acrylamidopropanesulphonic acid.

The emulsifier content is preferably 0.1 to 5% by weight, relative to polymer. The protective colloid content is preferably 0.1 to 15% by weight, relative to polymer. Mixtures of emulsifier and protective colloid can also be present. Preferably, the interlayer contains partially saponified polyvinyl alcohols having a degree of hydrolysis from 60 to 95 mol %, preferably as a mixture with emulsifier(s).

Preferably, the interlayer comprises vinyl acetate/ethylene copolymers, if appropriate with a content of N-methylolacrylamide and/or the said water-soluble ethylenically unsaturated comonomers, and polyvinyl alcohol and/or emulsifier. An interlayer is also preferred which contains vinyl acetate homopolymers or copolymers of vinyl acetate with VeoVa10 and also polyvinyl alcohol and/or emulsifier and which, if appropriate, has been externally plasticized.

The preparation of the dispersion polymers of the interlayer is preferably carried out by the emulsion polymerization process in aqueous phase and is initiated by the water-soluble free-radical formers normally used for the emulsion polymerization. The dispersants used are the emulsifiers and/or protective colloids mentioned above which are normally used in emulsion polymerization. Preferably, the polymerization is carried out at a temperature between 30 and 100° C. and at a pressure of below 100 bar. The polymerization is carried out at a pH of preferably 2 to 7.

The interlayer can have any desired thickness, and this is preferably 4 to 40 µm, particular preferably 4 to 20 µm.

For the layer of pressure-sensitive adhesive, all conventional pressure-sensitive adhesives or pressure-sensitive adhesive compositions based on polymer dispersions, hot-melt adhesives and radiation-crosslinkable systems are suitable. Examples of these are acrylic acid ester copolymers, copolymers of acrylic acid esters with vinyl esters and, if appropriate, ethylene, copolymers of acrylic acid esters or vinyl esters with maleic and fumaric acid esters, or thermoplastic rubbers such as styrene/butadiene block copolymers and styrene/isoprene block copolymers. The acrylic acid ester copolymers and the copolymers of acrylic acid esters with vinyl ester and, if appropriate, ethylene are preferred.

Suitable acrylic acid esters and vinyl esters are the abovementioned preferred vinyl esters such as vinyl acetate, vinyl propionate, vinyl 2-ethylhexanoate, vinyl laurate, 1-methylvinyl acetate, vinyl pivalate and vinyl esters of alpha-branched monocarboxylic acids having 5 to 10 C atoms, for example $VV5^R$, $VeoVa9^R$ or $VeoVa10^R$, and the already mentioned acrylic acid esters such as methyl acrylate, ethyl acrylate, propyl acrylate, n-butyl acrylate, iso-butyl acrylate, t-butyl acrylate, 2-ethylhexyl acrylate and n-octyl acrylate. For the layer of pressure-sensitive adhesive, the copolymer composition is selected such that the glass transition temperature Tg of the copolymers is below −20° C., preferably from −60° C. to −30° C.

The conventional pressure-sensitive adhesive dispersions usually contain a proportion of water-soluble, ethylenically unsaturated auxiliary monomers of the abovementioned type in quantities of up to 10% by weight, relative to polymer.

To improve the tack, pressure-sensitive adhesive compositions containing tackifier can also be used. Examples of tackifiers are the colophony resins which are also known as balsamic resins or tall resins, as well as their derivatives such as dimerized, disproportionated and hydrogenated colophony. Further examples are the glycol esters, glycerol esters and pentaerythritol esters of the balsamic resins such as colophony diethylene glycol ester, hydrocarbon resins, polyterpene resins, coumarone/indene resins and terpene/phenol resins.

The pressure-sensitive adhesive layer can have any desired thickness, preferably 10 to 40 µm, particularly preferably 10 to 25 µm.

In a preferred embodiment, the film of pressure-sensitive adhesive is anchored to the polymer film of the interlayer by chemical crosslinking. The crosslinking can be effected, for example, by using mixtures of the pressure-sensitive adhesive or of the pressure-sensitive adhesive composition with di- or polyfunctional crosslinking agents (2-component systems). Suitable crosslinking agents are the conventional crosslinking agents which react with hydroxyl-, amide- or carboxyl-functional polymers, such as the polyvinyl alcohol fraction of the interlayer or the functional monomer units of the polymer of the interlayer and of the layer of pressure-sensitive adhesive.

Examples of conventional crosslinking agents are aziridines, melamine resins, preferably di- or polyfunctional isocyanates such as methylenediphenyl diisocyanate (MDI) or isophorone diisocyanate. Water-emulsifiable, oligomeric polyisocyanates, which give a pot life of the adhesive system of several hours, are particularly preferred. The content of these crosslinking agents is in general 0.5 to 10% by weight, preferably 0.5 to 5% by weight, in each case relative to the total weight of the pressure-sensitive adhesive composition.

A further preferred embodiment of the film of pressure-sensitive adhesive, for anchoring the latter on the dispersion polymer film of the interlayer, is the use of pressure-sensitive adhesive copolymers based on the abovementioned monomers which contain crosslinkable comonomer units. Examples of such comonomer units are monomers containing epoxy groups, such as glycidyl methacrylate. Further examples are N-methylol-functional monomer units such as N-methylolacrylamide, N-methylolmethacrylamide, N-(alkoxymethyl)acrylamides or N-(alkoxymethyl)methacrylamides having a $C_1$- to $C_6$-alkyl radical, such as N-(isobutoxymethyl)acrylamide (IBMA), N-(isobutoxymethyl)methacrylamide (IBMMA), N-(n-butoxymethyl)acrylamide (NBMA) and N-(n-butoxymethyl)methacrylamide (NEMMA). Comonomers containing carbonyl groups, such as diacetoneacrylamide or crotonaldehyde, which are converted for crosslinking or anchoring with the addition of crosslinking agents containing hydrazide groups, such as adipic acid dihydrazide, or of crosslinking agents containing aminooxy groups, such as 1,4-diaminooxybutane or 2-aminooxypropionic acid hydrazide, are also suitable. Preferably, the content of the comonomer units is 0.1 to 3% by weight, relative to the pressure-sensitive adhesive polymer.

The production of the composite paper material can be carried out in known coating units. The polymer forming the interlayer is applied in the form of an aqueous dispersion with a solids content of 30 to 75% by weight, preferably 50 to 75% by weight and particularly preferably 58 to 75% by weight, to the paper carrier, for example by means of a blade. The procedure can here also be such that the dispersion is applied to a release material, for example a paper provided with a silicone release layer, and dried, and is transferred directly to the paper by laminating it to the paper carrier. Preferably, the polymer layer is produced by direct application of the appropriate aqueous dispersion to the paper carrier and subsequent drying in a drying duct. The drying temperature is here in general between 50° C. and 200° C.

To produce a crosslinked interlayer, copolymer dispersants with crosslinkable comonomer units or a mixture of aqueous copolymer dispersion and the external crosslinking agent are used. The application takes place analogously to the procedure for producing the uncrosslinked interlayer. The crosslinking occurs during the drying step. For accelerating the crosslinking, drying temperatures above 100° C., preferably up to 170° C. can also be used here if desired, or the abovementioned hardeners can be added.

In the second process step, the layer of pressure-sensitive adhesive is applied to the interlayer. This can be carried out with a time offset after the application of the interlayer (off-line), or preferably directly after the application of the polymer layer in one working step (in-line). The latter method requires a suitable design of the coating unit.

The pressure-sensitive adhesive composition which, if appropriate, also contains tackifier, processing aids such as antifoams or wetting agents or external crosslinking agents, can here be applied in the form of an aqueous dispersion having a preferred solids content of 50 to 75% by weight or as a melt. If appropriate, the pressure-sensitive adhesive composition is crosslinked by radiation, for example UV radiation or electron beams. The application of the layer of pressure-sensitive adhesive takes place in the usual manner either by direct application to the interlayer, for example by means of a blade or roller application, or by coating a release material, preferably siliconized release paper, with the pressure-sensitive adhesive, if appropriate drying it, preferably at 50° C. to 200° C., or radiatively crosslinking it and subsequently laminating it to the paper carrier provided with the interlayer. In this case, the layer of pressure-sensitive adhesive is transferred to the polymer film forming the interlayer. If necessary, a backing material or release material, preferably siliconized release paper, is fed in during the subsequent winding-up of the resulting composite paper material.

During the coating with pressure-sensitive adhesive compositions with an external crosslinking agent or during the coating with pressure-sensitive adhesives based on copolymers with crosslinkable monomer units, the pressure-sensitive adhesive is preferably applied as an aqueous dispersion directly to the interlayer, for example by means of a blade. For crosslinking, the drying takes place at room temperature or elevated temperature, preferably at temperatures from 100° C. to 200° C. Subsequently, a backing material or release material, preferably siliconized release paper, is fed in during the winding-up of the composite paper material obtained.

In the composite paper material according to the invention, the introduction of the moisture-resistant and hydrophilic interlayer provides a composite which, on repulping, almost completely sets the paper fibre free and minimizes the fibre loss. During repulping, the adhesive layer arises together with the interlayer in such large pieces that almost complete screening of these pieces by means of the screens usual in paper recycling is possible. Consequently, no specific cleaning step, for example flotation, is necessary for separating the particles of pressure-sensitive adhesive from the pulp. Concentrating of polymer in the water circulation of the paper machine is effectively prevented. The risk of the formation of stickies is minimized and the content of organic constituents, especially polymer, in the effluent is greatly reduced.

The examples which follow serve for further explanation of the invention:

Test Method:

For repulping, 250 g of water were put into a 400 ml beaker, and 4 g of coated label paper (80 g/m$^2$ vellum paper) was torn into pieces of about 2×2 cm and suspended in water, free of lumps as far as possible. The water and the label paper were transferred into a kitchen mixer (Type D 70 Moulinex) and defibrated for 20 minutes at speed stage 3. The content of the mixer was then put into a 1 l beaker and made up to a total quantity of 400 g of water and fibre pulp. The mixture was then homogenized for 1 minute using a wing stirrer at about 1200 rpm. About 5 g were taken from the homogeneous mixture and distributed on an absorbent paper over a surface area of about 5×5 cm.

The size of the adhesive particles was measured. The detachment of the layer of pressure-sensitive adhesive from the interlayer and the adhesion of the paper fibre to the interlayer were assessed qualitatively.

The dispersion for producing the interlayer and the pressure-sensitive adhesive were coloured by the addition of small quantities (<0.5%) of different dyes (for example helizarin blue). In this way, it was possible to distinguish the interlayer and the layer of pressure-sensitive adhesive in the pulp.

EXAMPLE 1

An aqueous dispersion of a copolymer of vinyl acetate and ethylene (ethylene content about 18% by weight; Tg (DSC)=3° C.) with 4% by weight of polyvinyl alcohol (degree of hydrolysis 88%) and 0.5% by weight of an alkylalcoholethoxylate emulsifier, each relative to the polymer content, was applied by means of a wire blade to 80 g/m$^2$ vellum paper in a layer thickness of 15 μm (dry). An aqueous dispersion of a pressure-sensitive adhesive composition consisting of an acrylic acid ester copolymer (Tg=−57° C.; 40% by weight), a copolymer of vinyl acetate, ethylene and acrylic acid ester (Tg=−35° C.; 30% by weight) and disproportionated colophony as tackifier (30% by weight relative to dry mass) as well as wetting agent and antifoam was applied in a layer thickness of 18 μm (dry) to the dry interlayer.

After repulping of the composite material thus obtained, the paper fibres were completely separate from the polymer layer. The interlayer and the pressure-sensitive adhesive were in the form of a composite. More than 95% of the total polymer area was present in particles greater than 2 mm.

COMPARISON EXAMPLE 1

The procedure was analogous to that in Example 1, with the difference that no interlayer was applied, but the pressure-sensitive adhesive composition from Example 1 was applied directly to 80 g/m$^2$ vellum paper in a layer thickness of 22 μm. After repulping, more than 50% of the layer of pressure-sensitive adhesive were present in non-screenable particles smaller than 0.5 mm.

EXAMPLE 2

The procedure was analogous to Example 1, with the difference that, for producing the interlayer, an aqueous dispersion of a vinyl acetate/ethylene copolymer with 2% by weight of N-methylolacrylamide, stabilized with 5% by weight of polyvinyl alcohol (degree of hydrolysis 88%) and 1% by weight of alkylphenol-ethoxylate emulsifier, each relative to the polymer content, which also contained 3% by weight, relative to the dispersion, of a 50% aqueous solution of aluminium chloride 6-hydrate as a hardener, was applied. The thickness of the dry interlayer was 15 μm. The pressure-sensitive adhesive applied was that from Example 1 in a film thickness (dry) of about 17 μm.

After repulping of the composite material thus obtained, the paper fibres were completely separate from the polymer layer. The interlayer and pressure-sensitive adhesive were in the form of a composite. More than 95% of the total polymer area was in the form of screenable particles larger than 2 mm.

EXAMPLE 3

The procedure was analogous to Example 1, with the difference that, for producing the interlayer, an aqueous dispersion of a copolymer of vinyl acetate, ethylene, n-butyl acrylate and N-methylolacrylamide (Tg about −14° C.)

stabilized with alkylphenol ethoxylate emulsifier was applied in a thickness of 12 μm (dry). The pressure-sensitive adhesive applied was that from Example 1 in a thickness (dry) of about 15 μm.

After repulping of the composite material thus obtained, the paper fibres were completely separate from the polymer layer. The interlayer and the pressure-sensitive adhesive were in the form of composite. More than 95% of the total polymer area was present in the form of screenable particles larger than 3 mm.

EXAMPLE 4

The procedure was analogous to Example 1, with the difference that, for producing the interlayer, an aqueous dispersion of a copolymer of vinyl acetate and N-methylolacrylamide (Tg about 35° C.) stabilized with polyvinyl alcohol (degree of hydrolysis 88%), which also contains 2.5% by weight of butyldiglycol acetate as a film-forming auxiliary and 2% by weight of aluminium nitrate 9-hydrate, each relative to the dispersion, was applied in a thickness of 20 μm (dry). The pressure-sensitive adhesive applied was that from Example 1 in a thickness (dry) of about 20 μm.

After repulping of the composite material thus obtained, the paper fibres were completely separate from the polymer layer. The interlayer and pressure-sensitive adhesive were in the form of a composite. More than 95% of the total polymer area was present in the form of screenable particles larger than 1 mm.

EXAMPLE 5

The interlayer was produced using an aqueous dispersion, containing a film-forming auxiliary, of a styrene/butyl acrylate copolymer (Tg about 10° C.), which had been stabilized with alkylethoxylate emulsifier, in a layer thickness of 18 μm. The pressure-sensitive adhesive used was an aqueous copolymer dispersion of 2-ethylhexyl acrylate, n-butyl acrylate, vinyl acetate and acrylic acid, having a Tg of about −45° C. Before the application to the interlayer, 3% by weight, relative to the dispersion, of a water-emulsifiable, polyfunctional, oligomeric isocyanate were mixed with the dispersion of pressure-sensitive adhesive. The pot life of the mixture was about 8 hours.

After the application and drying of the layer of pressure-sensitive adhesive, repulping was carried out. The interlayer and the pressure-sensitive adhesive were anchored to one another and were in the form of a composite. More than 95% of the total polymer area was present in the form of screenable particles larger than 3 mm.

EXAMPLE 6

The production of the composite paper material was carried out analogously to Example 5, with the difference that no isocyanate was mixed into the dispersion of pressure-sensitive adhesive.

After repulping, about 50% of the polymer area was in the form of screenable particles. The particle size was greater than 1 mm.

EXAMPLE 7

The production of the interlayer was carried out analogously to Example 1. The pressure-sensitive adhesive used was an aqueous dispersion of a copolymer of 2-ethylhexyl acrylate, n-butyl acrylate and vinyl acetate with 2% by weight of N-methylolacrylamide (Tg=−45°). The layer of pressure-sensitive adhesive was dried at above 130° C.; the thickness was 20 μm (dry).

After repulping of the composite material thus obtained, the paper fibres were completely separate from the polymer layer. The interlayer and pressure-sensitive adhesive were in the form of a composite. More than 95% of the total polymer area was in the form of screenable particles larger than 2 mm.

EXAMPLE 8

The composite paper material was produced analogously to Example 7, with the difference that the copolymer of the dispersion of pressure-sensitive adhesive did not contain any N-methylolacrylamide. After drying of the layer of pressure-sensitive adhesive applied to the interlayer in a thickness of 20 μm (dry), repulping was carried out.

After repulping, detachment of the layer of pressure-sensitive adhesive from the interlayer was observed on about 50% of the polymer area. The particle size was about 1 mm.

EXAMPLE 9

The interlayer was produced analogously to Example 1. The pressure-sensitive adhesive used was a hot-melt pressure-sensitive adhesive consisting of 45% of a polystyrene/polybutadiene/polystyrene block copolymer, 53% of a colophony resin ester as tackifier and 2% of an antioxidant as an anti-ageing additive, and this was applied with a blade to the silicone side of a siliconized separating paper in a layer thickness of 20 μm. The paper carrier provided with the dry interlayer was then laminated to the separating paper coated with the hot-melt pressure-sensitive adhesive. The layer of pressure-sensitive adhesive was thus transferred to the interlayer. After repulping of the composite material thus obtained, the paper fibres were completely separate from the polymer layer. The interlayer and hot-melt pressure-sensitive adhesive were present as a composite. More than 95% of the total polymer area was in the form of screenable particles larger than 3 mm.

COMPARISON EXAMPLE 2

The procedure followed was analogous to Example 1, with the difference that, for producing the interlayer, an aqueous dispersion of a copolymer of vinyl acetate, ethylene and 2-ethylhexyl acrylate, having a Tg of only −35° C. and stabilized with alkylphenol-ethoxylate emulsifier, was applied in a thickness of 14 μm (dry). The pressure-sensitive adhesive applied in a thickness of about 18 μm (dry) was that from Example 1.

After repulping of the composite material thus obtained, far more than 50% of the total polymer area was in the form of non-screenable particles smaller than 0.5 mm.

What is claimed is:

1. A composite paper material with a pressure-sensitive adhesive coating resistant to repulping, said composite paper material comprising a paper carrier, a layer of pressure-sensitive adhesive, and an interlayer film between said paper carrier and said layer of pressure-sensitive adhesive, said interlayer film comprising a moisture-resistant, hydrophilic, and non-repulpable dispersion polymer film containing a protective colloid, an emulsifier, or both a protective colloid and an emulsifier, said protective colloid and/or emulsifier facilitating detachment of said interlayer film from said paper carrier during a repulping process, said dispersion polymer film having a glass transition temperature Tg, from −20° C. to +40° C., and comprising one or more polymers selected from the group consisting of homo- and copolymers of vinyl esters of alkylcarboxylic acids having 1 to 15 C atoms, homo- and copolymers of esters of (meth)acrylic acid with alcohols having 1 to 12 C atoms, and styrene/butadiene copolymers, each of said homo- and copolymers optionally further containing crosslinkable, ethylenically unsaturated monomers, and up to 5 weight percent based on the weight of the dispersion polymer of water soluble, ethylenically unsaturated monomers other than said crosslinkable ethylenically unsaturated monomers, said interlayer positioned adjacent said layer of pressure-sensitive adhesive.

2. The composite paper material of claim 1, wherein said interlayer film has a thickness of from 4 μm to 40 μm, and comprises one or more polymers selected from the group consisting of vinyl acetate homopolymers, vinyl acetate/ethylene copolymers, vinyl acetate/ethylene/vinyl chloride copolymers, copolymers of vinyl acetate with vinyl ester(s) of an alpha-branched carboxylic acids having 5 to 10 C atoms, vinyl acetate/n-butyl acrylate copolymers, copolymers of methyl methacrylate with n-butyl acrylate and/or 2-ethylhexyl acrylate, copolymers of n-butyl acrylate or 2-ethylhexyl acrylate with styrene, and mixtures thereof, all of said polymers optionally further containing crosslinkable, ethylenically unsaturated monomers, and up to 5 weight percent based on the weight of the polymer of water soluble, non-crosslinkable ethylenically unsaturated monomers.

3. The composite paper material of claim 2, wherein said water-soluble, ethylenically unsaturated monomers include one or more monomers selected from the group consisting of acrylic acid, methacrylic acid, acrylamide, methacrylamide, hydroxyethyl acrylate, hydroxyethyl methacrylate, hydroxypropyl acrylate, hydroxypropyl-methacrylate and acrylamidopropanesulphonic acid.

4. The composite paper material of claim 1, wherein 0.1 to 5% by weight, relative to polymer, of emulsifier, and/or 0.1 to 15% by weight, relative to polymer, of protective colloid are present.

5. The composite paper material of claim 4, wherein said protective colloid comprises partially saponified polyvinyl alcohol having a degree of hydrolysis of 60 to 95 mol %.

6. The composite paper material of claim 1, wherein the dispersion polymers for producing the interlayer further comprise 0.1 to 5% by weight relative to the total weight of the dispersion polymers of one or more auxiliary monomers for crosslinking, ethylenically polyunsaturated co-monomers for crosslinking, or ethylenically polyunsaturated co-monomers having a crosslinking action, or contain 0.1 to 3.0% by weight, relative to the total weight of polymer, of co-monomers containing carbonyl groups, in combination with crosslinking agents containing hydrazide groups or crosslinking agents containing amino-oxy groups.

7. The composite paper material of claim 6, wherein said co-monomer containing carbonyl group is diacetoneacrylamide or crotonaldehyde.

8. The composite paper material of claim 2, wherein the pressure-sensitive adhesives employed comprise acrylic acid ester copolymers, copolymers of acrylic acid esters with vinyl esters and optionally ethylene, copolymers of acrylic acid esters or vinyl esters with esters of maleic and fumaric acids, styrene/butadiene block copolymers, or styrene/isoprene block copolymers, said adhesives having a Tg below −20° C., and applied in the form of polymer dispersions, hot-melt adhesives, or radiation-crosslinkable systems.

9. The composite paper material of claim 2, wherein the pressure-sensitive adhesive layers and/or pressure-sensitive adhesive composition employed are those containing di- or polyfunctional crosslinking agents which react with hydroxyl-, amide-, or carboxyl-functional polymers.

10. The composite paper material of claim 2, wherein said interlayer and said pressure-sensitive adhesive layer are anchored together by chemical crosslinking.

11. A process for producing a composite paper material with a pressure-sensitive adhesive coating resistant to repulping, comprising:
  a) applying to a paper carrier, an aqueous dispersion of homo- or copolymers, said aqueous dispersion stabilized by a protective colloid, an emulsifier, or both a protective colloid and emulsifier, said homo- or copolymers having a glass transition temperature Tg from −20° C. to +40° C., and comprising homo- or copolymers of vinyl esters of alkylcarboxylic acids having 1 to 15 C atoms, homo- or copolymers of esters of (meth)acrylic acid with alcohols having 1 to 12 C atoms, styrene/butadiene copolymers, or mixtures thereof, each of said homo- and copolymers optionally containing further crosslinkable, ethylenically unsaturated monomers, and up to 5 weight percent based on the weight of the dispersion polymer of water-soluble, ethylenically unsaturated monomers other than said crosslinkable, ethyleneically unsaturated monomers and drying to form a moisture-resistant, hydrophilic interlayer film, the amount of protective colloid and/or emulsifier present in an amount effective to facilitate release of said interlayer film from said paper carrier during repulping of said composite paper material;
  b) applying a pressure-sensitive adhesive composition to the interlayer film formed in process step a) and, optionally drying said pressure-sensitive adhesive composition.

12. The process of claim 11, wherein said interlayer film has a thickness of from 4 μm to 40 μm, and comprises one or more polymers selected from the group consisting of vinyl acetate homopolymers, vinyl acetate/ethylene copolymers, vinyl acetate/ethylene/vinyl chloride copolymers, copolymers of vinyl acetate with vinyl ester(s) of alpha-branched carboxylic acids having 5 to 10 C atoms, vinyl acetate/n-butyl acrylate copolymers, copolymers of methyl methacrylate with n-butyl acrylate and/or 2-ethylhexyl acrylate, copolymers of n-butyl acrylate or 2-ethylhexyl acrylate with styrene, and mixtures thereof, all of said copolymers optionally containing crosslinkable, ethylenically unsaturated monomers, and up to 5 weight percent based on the weight of the polymer of water soluble, ethylenically unsaturated monomers other than said crosslinkable, ethylenically unsaturated monomers.

13. The process of claim 12, wherein said polymers containing water-soluble, ethylenically unsaturated monomers include one or more monomers selected from the group consisting of acrylic acid, methacrylic acid, acrylamide, methacrylamide, hydroxyethyl acrylate, hydroxyethyl methacrylate, hydroxypropyl acrylate, hydroxypropyl-methacrylate, and acrylamidopropanesulphonic acid.

14. The process of claim 11, wherein 0.1 to 5% by weight, relative to polymer, of emulsifier, and/or 0.1 to 15% by weight, relative to polymer, of protective colloid are present.

15. The process of claim 14, wherein said protective colloid comprises partially saponified polyvinyl alcohol having a degree of hydrolysis of 60 to 95 mol %.

16. The process of claim 11, wherein the dispersion polymers of the interlayer further comprise 0.1 to 5% by weight relative to the total weight of the polymer of one or more auxiliary monomers for crosslinking, ethylenically polyunsaturated co-monomers for crosslinking, or ethylenically polyunsaturated co-monomers having a crosslinking action, or contain 0.1 to 3.0% by weight, relative to the total weight of polymer, of co-monomers containing carbonyl groups, in combination with crosslinking agents containing hydrazide groups or crosslinking agents containing amino-oxy groups.

17. The process of claim 16, wherein said co-monomer containing carbonyl groups is diacetoneacrylamide or crotonaldehyde.

18. The process of claim 12, wherein the pressure-sensitive adhesives employed comprise acrylic acid ester copolymers, copolymers of acrylic acid esters with vinyl esters and optionally ethylene, copolymers of acrylic acid esters or vinyl esters with esters of maleic and fumaric acids, styrene/butadiene block copolymers, or styrene/isoprene block copolymers, said adhesives having a Tg below −20° C., and applied in the form of polymer dispersions, hot-melt adhesives, or radiation-crosslinkable systems.

19. The process of claim 12, wherein the pressure-sensitive adhesive layers and/or pressure-sensitive adhesive composition employed are those containing di- or polyfunctional crosslinking agents which react with hydroxyl-, amide-, or carboxyl-functional polymers.

20. The process of claim 11, wherein in process step a), the aqueous dispersion is applied to the paper carrier by means of a blade and is dried, or is applied to a paper provided with a silicone release layer, dried and transferred to a paper carrier by lamination and, in process step b), the application of the layer of pressure-sensitive adhesive is carried out either by direct application to the interlayer, or by coating a release material with the pressure-sensitive adhesive, optionally drying or radioactively crosslinking, and subsequently laminating the adhesive to a paper carrier provided with the interlayer.

21. The process of claim 20, wherein said direct application is by means of a blade or roller application, optionally followed by drying and/or radioactively crosslinking.

22. The process of claim 20, wherein said release material comprises siliconized release paper.

23. The process of claim 11, further comprising:

c) anchoring said pressure-sensitive adhesive layer to said interlayer by chemical crosslinking.

* * * * *